(12) United States Patent
Anders

(10) Patent No.: US 11,883,911 B2
(45) Date of Patent: Jan. 30, 2024

(54) WELDING POWER SUPPLIES, WIRE FEEDERS, AND SYSTEMS TO MEASURE A WELD CABLE IMPEDANCE

(71) Applicant: Illinois Tool Works Inc., Glenview, IL (US)

(72) Inventor: Adam E. Anders, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 619 days.

(21) Appl. No.: 17/125,324

(22) Filed: Dec. 17, 2020

(65) Prior Publication Data
US 2021/0187648 A1 Jun. 24, 2021

Related U.S. Application Data

(60) Provisional application No. 62/950,657, filed on Dec. 19, 2019.

(51) Int. Cl.
*B23K 9/095* (2006.01)
*B23K 9/12* (2006.01)
*B23K 9/10* (2006.01)

(52) U.S. Cl.
CPC .......... *B23K 9/0956* (2013.01); *B23K 9/0953* (2013.01); *B23K 9/1062* (2013.01); *B23K 9/124* (2013.01)

(58) Field of Classification Search
CPC .... B23K 9/1064; B23K 9/124; B23K 9/0953; B23K 9/956
See application file for complete search history.

(56) References Cited

U.S. PATENT DOCUMENTS

| | | | |
|---|---|---|---|
| 6,359,258 B1 | 3/2002 | Blankenship | |
| 9,943,925 B2 * | 4/2018 | Denis | B23K 9/1087 |
| 2015/0283620 A1 | 10/2015 | Pfeifer | |
| 2017/0252849 A1 * | 9/2017 | Ryan | H05B 6/101 |
| 2018/0126477 A1 | 5/2018 | Kooken | |
| 2018/0130377 A1 | 5/2018 | Meess | |
| 2018/0257161 A1 | 9/2018 | Anders | |
| 2018/0257162 A1 | 9/2018 | Johnson | |

OTHER PUBLICATIONS

PCT, Notification of Transmittal of the International Search Report and the Written Opinion of the International Searching Authority, or the Declaration, International application No. PCT/US2020/066069, dated Apr. 23, 2021 (13 pages).

* cited by examiner

*Primary Examiner* — Dana Ross
*Assistant Examiner* — Joe E Mills, Jr.
(74) *Attorney, Agent, or Firm* — McAndrews, Held & Malloy, Ltd.

(57) ABSTRACT

Welding power supplies, wire feeders, and systems to measure a weld circuit resistance via communications over the weld circuit are disclosed. An example welding-type power supply includes: a power conversion circuitry configured to: convert input power to output a signal via a weld circuit; and convert the input power to output welding-type power via the weld circuit; a voltage monitor configured to measure a power supply output voltage of the signal; communications circuitry configured to receive, via the weld circuit, a communication of a second voltage measurement; and control circuitry configured to: determine a resistance and/or and inductance of a portion of the weld circuit based on the power supply output voltage measurement, the second voltage measurement, and a weld circuit current.

20 Claims, 6 Drawing Sheets

WELDING POWER SUPPLIES, WIRE FEEDERS, AND SYSTEMS TO MEASURE A WELD CABLE IMPEDANCE

CROSS REFERENCE TO RELATED APPLICATIONS

This present application claims the benefit of U.S. Provisional Patent Application Ser. No. 62/950,657 filed Dec. 19, 2019, entitled "WELDING POWER SUPPLIES, WIRE FEEDERS, AND SYSTEMS TO MEASURE A WELD CABLE IMPEDANCE." The entire content of U.S. Provisional Patent Application Ser. No. 62/950,657 is expressly incorporated herein by reference.

BACKGROUND

This disclosure relates generally to welding systems and, more particularly, to welding power supplies, wire feeders, and systems to measure a weld cable impedance.

Some welding applications, such as coal-fired boiler repair, shipyard work, and so forth, may position a welding location or workpiece a non-insignificant distance away from a welding power source. Accordingly, in some applications, weld cables may produce a non-negligible voltage drop between the power source and the site of the work (e.g., the wire feeder, the torch). It is therefore desirable for systems and methods to determine the resistance and/or impedance of the weld cables.

SUMMARY

Welding power supplies, wire feeders, and systems to measure a weld circuit impedance, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
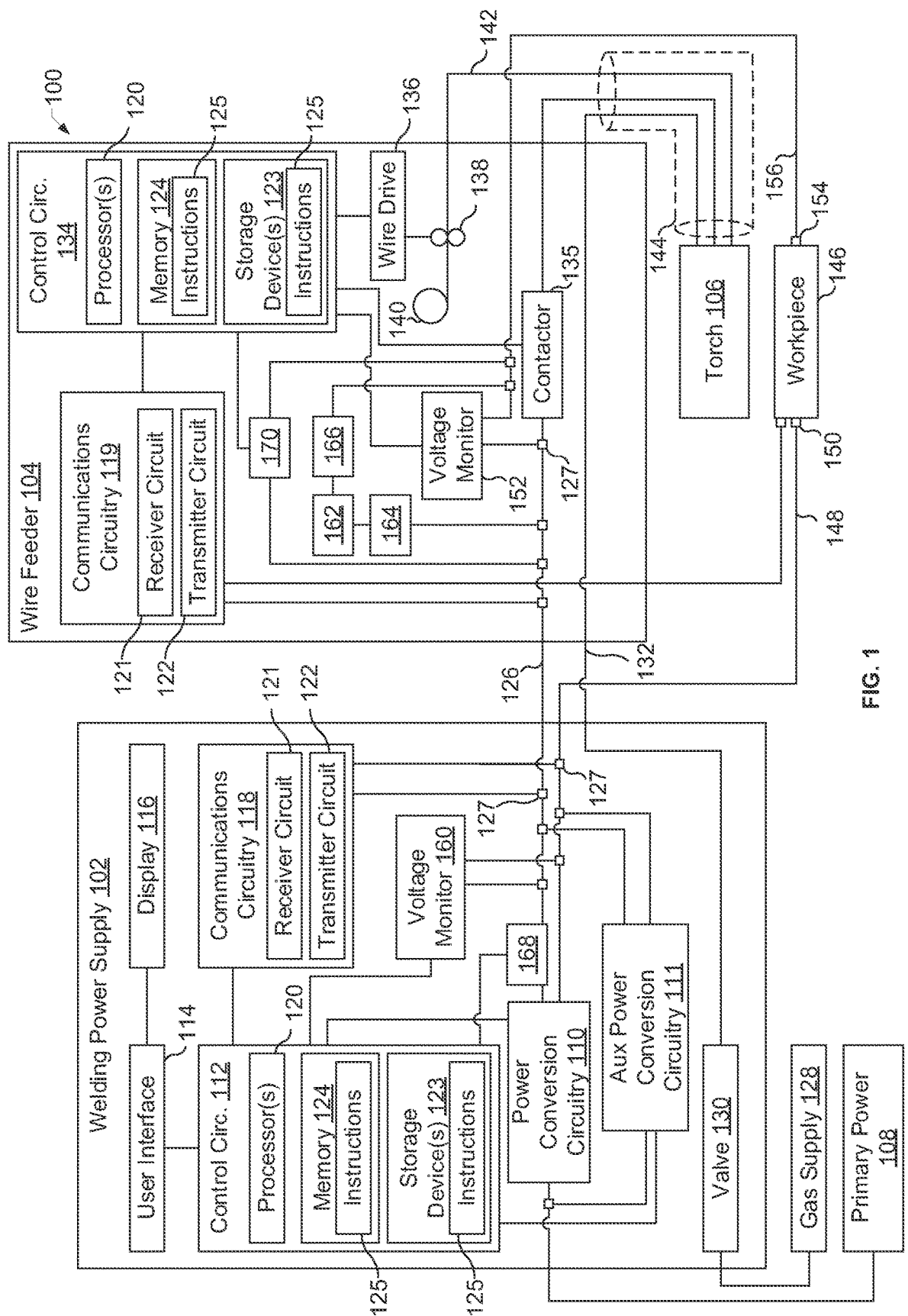
FIG. 1 shows an example welding-type system in accordance with aspects of this disclosure.

Disclosed examples perform an impedance (e.g., resistance and/or inductance) measurement of a portion of a weld circuit (e.g., a weld cable). In some examples, the impedance measurement involves closing a switch at a welding device coupled to the weld circuit, to cause short circuiting of a portion of the weld circuit. The impedance measurement also involves generating a first signal at a controlled voltage, where the current of the first signal is limited to a threshold level. The weld circuit voltages and the current may then be used with Ohm's law to calculate a resistance of the remaining portion of the weld circuit after the weld circuit is shunted. The power supply may use the resistance as an compensation value to generate a weld voltage that is close to a weld voltage setpoint. The power supply may also determine an inductance of a portion of the weld circuit by sampling the current and sampling voltages at points in the weld circuit during a ramp up condition of the test signal. While other methods determine voltage drops between the power supply and the welding device coupled to the power supply, disclosed examples allow the resistance and/or inductance measurement(s) to be taken at any time when the system is not welding (e.g., any time when the power supply is not outputting welding-type power for a welding-type application).

Weld cable communications enable components of welding systems, such as a welding power supply and a wire feeder, to communicate via a same cable used to deliver welding current from the power supply to the wire feeder (and to a welding torch attached to the wire feeder). Weld cable communications enable a simplification of a welding system by, for example, removing one or more cables that were conventionally used for control signals.

Disclosed example welding-type power supplies include: power conversion circuitry configured to convert input power to welding-type power; a voltage monitor configured to measure a power supply output voltage of the power conversion circuitry; communication circuitry configured to transmit a first communication to a welding device coupled to the weld circuit, where the first communication comprises a command to the welding device to close a switch to complete a measurement circuit, where the measurement circuit comprises a first portion of the weld circuit; and control circuitry configured to control the power conversion circuitry to: output a first signal at a controlled voltage to the measurement circuit; and after the first communication, limit a current of the first signal to a first threshold level; where the communication circuitry is configured to receive, from the welding device, a second communication indicating a welding device voltage measured in response to the first signal; and where the control circuitry is configured to determine a resistance of a second portion of the weld circuit based on the power supply output voltage, the welding device voltage, and the current of the first signal.

In some disclosed welding-type power supplies, the switch is configured to open a threshold period of time after closing.

Some disclosed welding-type power supplies further include a current monitor configured to measure a current of the measurement circuit.

In some disclosed welding-type power supplies, the communication circuitry is configured to send a third communication to the welding device when the current monitor senses that current of the first signal has reached the threshold level, wherein the third communication commands the welding device to open the switch.

In some disclosed welding-type power supplies, the communication circuitry is configured to send a third communication to the welding device a threshold period of time after the current monitor senses that the current of the first signal has reached the threshold level, wherein the third communication commands the welding device to open the switch.

In some disclosed welding-type power supplies, the control circuitry is configured to determine the resistance of the second portion of the weld circuit based on the measured current of the first signal.

In some disclosed welding-type power supplies, a magnitude of the first threshold level is less than a magnitude of the welding-type power current.

In some disclosed welding-type power supplies, the control circuitry is configured to control the power conversion circuitry to output the welding-type power based on the determined resistance.

In some disclosed welding-type power supplies, the control circuitry is configured to control the power conversion circuitry to output the welding-type power based on the determined resistance and a weld process parameter.

In some disclosed welding-type power supplies, the control circuitry is configured to determine the resistance of the second portion of the weld circuit prior to outputting welding-type current.

In some disclosed welding-type power supplies, the communications circuitry is configured to transmit a third communication to the welding device, where the third communication includes a command to the welding device to close the switch to complete the measurement circuit; the control circuitry is configured to control the power conversion circuitry to: output a second signal at the controlled voltage to the measurement circuit; and after the third communication, limit a current of the second signal to a second threshold level; the communications circuitry is further configured to receive a fourth communication from the welding device indicating a plurality voltage measurements during the second signal; and the control circuitry is configured to determine an impedance of a portion of the weld circuit based on the determined resistance, a plurality of current measurements, and the plurality voltage measurements.

In some disclosed welding-type power supplies, the second signal is output after the first signal.

In some disclosed welding-type power supplies, the switch is automatically opened between the first signal and the second signal.

In some disclosed welding-type power supplies, the control circuitry is configured to control the power conversion circuitry to output the welding-type power based on the determined impedance.

In some disclosed welding-type power supplies, the communications circuitry is configured to communicate with the welding device via the weld circuit.

Disclosed example welding devices include: communications circuitry configured to communicate with a welding-type power supply; a switch configured to selectively complete a measurement circuit, wherein the measurement circuit comprises a portion of a weld circuit; control circuitry configured to control the switch to complete the measurement circuit in response to a first communication from the welding-type power supply; and a voltage monitor configured to measure a voltage of a first signal received via the measurement circuit in response to detecting the first signal following reception of the first communication, the communications circuitry configured to transmit a second communication to the welding-type power supply based on the measured voltage of the first signal.

In some disclosed welding devices, the welding device is a wire feeder.

Some disclosed welding devices further include a current monitor configured to monitor a current of the first signal, and the control circuitry is configured to control the switch to open the measurement circuit in response to the current monitor determining that the current of the first signal has reached a threshold magnitude.

Some disclosed welding devices further include a current monitor configured to monitor a current of the first signal, and the control circuitry is configured to control the switch to open the measurement circuit a threshold period of time after the current monitor determines that the current of the first signal has reached a threshold magnitude.

In some disclosed welding devices, the control circuitry is configured to control the switch to open the measurement circuit a threshold period of time after receiving the first communication.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "weld voltage setpoint" refers to a voltage input to the power conversion circuitry via a user interface, network communication, weld procedure specification, or other selection method.

As used herein, the terms "circuit" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

The terms "control circuit" and "control circuitry," as used herein, may include digital and/or analog circuitry, discrete and/or integrated circuitry, microprocessors, digital signal processors (DSPs), and/or other logic circuitry, and/or associated software, hardware, and/or firmware. Control circuits may include memory and a processor to execute instructions stored in memory. Control circuits or control circuitry may be located on one or more circuit boards, that form part or all of a controller, and are used to control a welding process, a device such as a power source or wire feeder, motion, automation, monitoring, air filtration, displays, and/or any other type of welding-related system.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), flash memory, solid state storage, a computer-readable medium, or the like.

As used herein, the term "weld circuit" includes any and all components in an electrical path of a welding operation, regardless whether the welding operation is underway. For example, the weld circuit is considered to include any or all of: power conversion and/or conditioning component(s), weld cable conductor(s), weld torch(es), consumable or non-consumable welding electrode(s), workpiece(s), work clamp(s), ground cable(s) (return cables), and/or weld cable connections (e.g., weld studs that connect a welding power supply to a weld cable). As used herein, the "weld circuit" does not include components or conductors that do not conduct weld current at any time (e.g., that are not in the electrical path of the weld current). For example, the weld circuit does not include separate control cables that transmit data but do not transmit weld current.

As used herein, the term "filtering," as it applies to voltage and/or current values, refers to generating one or more representative values from a larger set of values. For example, a set of voltage values or measurements may be filtered to obtain an average voltage, a root-mean-square value of the voltage values, or any other representative or derivative value(s).

Welding operation, as used herein, includes both actual welds (e.g., resulting in joining, such as welding or brazing) of two or more physical objects, an overlaying, texturing, and/or heat-treating of a physical object, and/or a cut of a physical object) and simulated or virtual welds (e.g., a visualization of a weld without a physical weld occurring).

Turning now to the drawings, FIG. 1 is a block diagram of an example welding system 100 having a welding-type power supply 102, a wire feeder 104, and a welding torch 106. The welding system 100 powers, controls, and supplies consumables to a welding application. In some examples, the power supply 102 directly supplies input power to the welding torch 106. The welding torch 106 may be a torch configured for shielded metal arc welding (SMAW, or stick welding), tungsten inert gas (TIG) welding, gas metal arc welding (GMAW), flux cored arc welding (FCAW), based on the desired welding application. In the illustrated example, the power supply 102 is configured to supply power to the wire feeder 104, and the wire feeder 104 may be configured to route the input power to the welding torch 106. In addition to supplying an input power, the wire feeder 104 may supply a filler metal to a welding torch 106 for various welding applications (e.g., GMAW welding, flux core arc welding (FCAW)). While the example system 100 of FIG. 1 includes a wire feeder 104 (e.g., for GMAW or FCAW welding), the wire feeder 104 may be omitted and/or replaced by any other type of remote accessory device, such as a stick welding and/or TIG welding remote control interface that provides stick and/or TIG welding consumables to the welding application.

The power supply 102 receives primary power 108 (e.g., from the AC power grid, an engine/generator set, a battery, or other energy generating or storage devices, or a combination thereof), conditions the primary power, and provides an output power to one or more welding devices in accordance with demands of the system 100. The primary power 108 may be supplied from an offsite location (e.g., the primary power may originate from the power grid). The power supply 102 includes power conversion circuitry 110, which may include transformers, rectifiers, switches, and so forth, capable of converting the AC input power to AC and/or DC output power as dictated by the demands of the system 100 (e.g., particular welding processes and regimes). The power conversion circuitry 110 converts input power (e.g., the primary power 108) to welding-type power based on weld parameter setpoint(s) (e.g., a voltage setpoint, a current setpoint, etc.) and outputs the welding-type power via a weld circuit.

In some examples, the power conversion circuitry 110 is configured to convert the primary power 108 to both welding-type power and auxiliary power outputs. However, in other examples, the power conversion circuitry 110 is adapted to convert primary power only to a weld power output, and separate auxiliary conversion circuitry 111 is provided to convert primary power to auxiliary power. In some other examples, the power supply 102 receives a converted auxiliary power output directly from a wall outlet. Any suitable power conversion system or mechanism may be employed by the power supply 102 to generate and supply both weld and auxiliary power.

The power supply 102 includes control circuitry 112 to control the operation of the power supply 102. The power supply 102 also includes a user interface 114. The control circuitry 112 receives input from the user interface 114, through which a user may choose a process and/or input desired parameters (e.g., voltages, currents, particular pulsed or non-pulsed welding regimes, and so forth). The user interface 114 may receive inputs using any input device, such as via a keypad, keyboard, buttons, touch screen, voice activation system, wireless device, etc. Furthermore, the control circuitry 112 controls operating parameters based on input by the user as well as based on other current operating parameters. Specifically, the user interface 114 may include a display 116 for presenting, showing, or indicating, information to an operator. The control circuitry 112 may also include interface circuitry for communicating data to other devices in the system 100, such as the wire feeder 104. For example, in some situations, the power supply 102 wirelessly communicates with other welding devices within the welding system 100. Further, in some situations, the power supply 102 communicates with other welding devices using a wired connection, such as by using a network interface controller (NIC) to communicate data via a network (e.g., ETHERNET, 10baseT, 10base100, etc.). In the example of FIG. 1, the control circuitry 112 communicates with the wire feeder 104 via the weld circuit via communications circuitry 118, as described below.

The control circuitry 112 includes at least one controller or processor 120 that controls the operations of the power supply 102. The control circuitry 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

The example control circuitry 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124, along with code configured to provide a specific output (e.g., initiate wire feed, enable gas flow, capture welding current data, detect short circuit parameters, determine amount of spatter) during operation.

In some examples, the welding power flows from the power conversion circuitry 110 through a weld cable 126 to the wire feeder 104 and the welding torch 106. The example weld cable 126 is attachable and detachable from weld studs at each of the power supply 102 and the wire feeder 104 (e.g., to enable ease of replacement of the weld cable 126 in case of wear or damage). Furthermore, in some examples, welding data is provided with the weld cable 126 such that welding power and weld data are provided and transmitted together over the weld cable 126. The communications circuitry 118 is communicatively coupled to the weld cable 126 to communicate (e.g., send/receive) data over the weld cable 126. The communications circuitry 118 may be implemented based on various types of power line communications methods and techniques. For example, the communications circuitry 118 may utilize IEEE standard P1901.2 to provide data communications over the weld cable 126. In this manner, the weld cable 126 may be utilized to provide welding power from the power supply 102 to the wire feeder 104 and the welding torch 106. Additionally or alternatively, the weld cable 126 may be used to transmit and/or receive data communications to/from the wire feeder 104 and the welding torch 106. The communications circuitry 118 is communicatively coupled to the weld cable 126, for example, via cable data couplers 127, to characterize the weld cable 126, as described in more detail below. The cable data coupler 127 may be, for example, a voltage or current sensor.

The example communications transceiver 118 includes a receiver circuit 121 and a transmitter circuit 122. Generally, the receiver circuit 121 receives data transmitted by the wire feeder 104 via the weld cable 126 and the transmitter circuit 122 transmits data to the wire feeder 104 via the weld cable 126. As described in more detail below, the communications circuitry 118 enables remote configuration of the power supply 102 from the location of the wire feeder 104 and/or compensation of weld voltages by the power supply 102 using feedback information transmitted by the wire feeder 104.

Example implementations of the communications circuitry 118 are described in U.S. Pat. No. 9,012,807. The entirety of U.S. Pat. No. 9,012,807 is incorporated herein by reference. However, other implementations of the communications transceiver 118 may be used.

The example wire feeder 104 also includes communications circuitry 119, which may be similar or identical in construction and/or function as the communications circuitry 118 of the power supply.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 112 to enable, inhibit, or control gas flow (e.g., shielding gas) through the valve 130. Shielding gas exits the valve 130 and flows through a cable 132 (which in some implementations may be packaged with the welding power output) to the wire feeder 104 which provides the shielding gas to the welding application. In some examples, the welding system 100 does not include the gas supply 128, the valve 130, and/or the cable 132.

In some examples, the wire feeder 104 uses the welding power to power the various components in the wire feeder 104, such as to power wire feeder control circuitry 134. As noted above, the weld cable 126 may be configured to provide or supply the welding power. The power supply 102 may also communicate with communications circuitry 119 of the wire feeder 104 using the weld cable 126 and the communications circuitry 118 disposed within the power supply 102. In some examples, the communications circuitry 119 is substantially similar to the communications circuitry 118 of the power supply 102. The wire feeder control circuitry 134 controls the operations of the wire feeder 104. In some examples, the wire feeder 104 uses the wire feeder control circuitry 134 to detect whether the wire feeder 104 is in communication with the power supply 102 and to detect a current welding process of the power supply 102 if the wire feeder 104 is in communication with the power supply 102.

A contactor 135 (e.g., high amperage relay) is controlled by the wire feeder control circuitry 134 and configured to enable or inhibit welding power to continue to flow to the weld cable 126 for the welding application. In some examples, the contactor 135 is an electromechanical device. However, the contactor 135 may be any other suitable device, such as a solid state device. The wire feeder 104 includes a wire drive 136 that receives control signals from the wire feeder control circuitry 134 to drive rollers 138 that rotate to pull wire off a spool 140 of wire. The wire is provided to the welding application through a torch cable 142. Likewise, the wire feeder 104 may provide the shielding gas from the cable 132 through the cable 142. The electrode wire, the shield gas, and the power from the weld cable 126 are bundled together in a single torch cable 144 and/or individually provided to the welding torch 106.

The welding torch 106 delivers the wire, welding power, and/or shielding gas for a welding application. The welding torch 106 is used to establish a welding arc between the welding torch 106 and a workpiece 146. A work cable 148 couples the workpiece 146 to the power supply 102 (e.g., to the power conversion circuitry 110) to provide a return path for the weld current (e.g., as part of the weld circuit). The example work cable 148 attachable and/or detachable from the power supply 102 for ease of replacement of the work cable 148. The work cable 148 may be terminated with a clamp 150 (or another power connecting device), which couples the power supply 102 to the workpiece 146.

The example wire feeder 104 of FIG. 1 includes a voltage monitor 152 coupled to the weld circuit (e.g., electrically connected to the weld cable 126) and to the workpiece 146 via a clamp 154 and a work sense lead 156. The example voltage monitor 152 may be coupled to the weld circuit via a cable data coupler 127. The voltage monitor 152 measures a voltage at the wire feeder 104.

The voltage monitor 152 captures one or more measurements (e.g., samples) of the wire feeder voltage. In some examples, the voltage monitor 152 assigns time stamps to the measurements for use in performing calculations, compensation, and/or matching of measurements to other measurements.

The example voltage monitor 152 and/or the control circuitry 134 may perform filtering (e.g., analog and/or digital filtering) to determine a representative value of the voltage over a designated time period. The representative value may be a filtered voltage value based on the measurements captured by the voltage monitor 152, such as an average voltage over the designated time period or a root-mean-square voltage over the designated time period. For example, the voltage monitor 152 and/or the control circuitry 112 or the control circuitry 134 may calculate an average wire feeder voltage for an N second time period based on a corresponding number of measurements captured by the voltage monitor 152 at a designated rate. In some examples, the time period for filtering is selected based on the switching frequency of the power conversion circuitry 110 and/or a processing frequency used by the control circuitry 134 and/or the processor(s) 120.

The example control circuitry 134 stores the average weld voltage(s) and/or the voltage measurement(s) as voltage feedback information. The communications circuitry 119 transmits the wire feeder voltage feedback information to the power supply 102 via the weld circuit (e.g., via the weld cable 126).

In some examples, the voltage feedback information includes a characteristic of the weld cable 126 such as a model number or other identifier of the weld cable 126 that can be used to accurately compensate the weld voltage for the drop over the weld cable 126. For example, if a model of weld cable has a determinable impedance without measurements, the control circuitry 112 can use the identification of that weld cable to compensate the output from the power conversion circuitry 110.

When the power supply 102 receives the voltage measurements, the power supply 102 may execute an algorithm to determine the impedance of the weld cable 126, and may control the power conversion circuitry 110 based in part on the determined impedance.

The example power supply 102 includes a voltage monitor 160 that measures an actual power supply output voltage. The actual power supply output voltage is an approximation that is substantially equal to, but may be slightly different (e.g., a negligible difference) than, the real voltage that is output from the power supply 102 to the weld cable 126. In some examples, the voltage monitor 160 is included in the power conversion circuitry 110. In some examples, the voltage monitor 160 assigns time stamps to the measurements for use in performing calculations, compensation, and/or matching of measurements to other measurements.

In some examples, the power supply 102 may include a current monitor 168. Current measurements generated by the current monitor 168 may be filtered to determine, for example, an average current, a peak current, and/or an RMS current. In some examples, the current monitor 168 assigns time stamps to the measurements for use in performing calculations, compensation, and/or matching of measurements to other measurements.

The wire feeder 104 may include an energy storage device, such as an energy storage capacitor 162, isolated from the weld circuit through a diode bridge 164, such that no current flows when the weld circuit voltage is lower than the energy storage device charge voltage. Energy from the energy storage device 162 may be used to supply power to the control circuitry 134 and other circuits of the wire feeder 104. The wire feeder 104 may also include a switch 170. The switch 170 may be, for example an IGBT or a MOSFET. When closed, the switch 170 completes a measurement circuit, where the measurement circuit is a portion of the weld circuit. The measurement circuit bypasses the torch 106. When the switch 170 is closed, a diode 166 prevents current from flowing from the capacitor 162 to the measurement circuit. When the switch 170 is closed, the control circuitry 134 does not receive power from the weld circuit. The switch 170 is controlled by control circuitry 134 of the wire feeder 104. The communications circuitry 119 may receive a communication from the power supply 102 commanding the switch 170 to close, and the control circuitry 134 commands the switch 170 to close after receiving the communication from the power supply. As described below, the switch 170 may be closed to measure the weld cable 126 resistance and/or impedance.

As mentioned above, the weld cable 126 between the power supply 102 and the wire feeder 104 causes a voltage drop. The voltage drop caused by the weld cable 126 ($V_{cabledrop}$) can be expressed as a difference between a voltage measured at the power supply output (e.g., $V_{stud}$, measured across the power supply output studs or ports) and a voltage measured at the wire feeder 104 (e.g., $V_{feeder}$), as expressed in Equation 1 below. The $V_{feeder}$ term is received as the voltage feedback information, such as a weld voltage measurement and/or average weld voltage determined by the wire feeder 104 and communicated via the weld cable 126.

$$V_{cableDrop} = V_{stud} - V_{feeder} \qquad \text{Equation 1}$$

Adjusting the voltage output by the power conversion circuitry 110 (e.g., $V_{stud}$) by the voltage drop in the weld cable 126 (e.g., $V_{cableDrop}$) effectively raises the voltage at the wire feeder 104 (e.g., $V_{feeder}$). Thus, the example control circuitry 112 may adjust the power (e.g., voltage and/or current) output by the power conversion circuitry 110 to cause the voltage at the wire feeder 104 (e.g., effectively the weld voltage or arc voltage) to substantially match a voltage setpoint. The example control circuitry 112 may adjust the voltage setpoint (e.g., $V_{cmd}$) to determine an adjusted voltage setpoint $V_{adjustedcmd}$ (e.g., an adjusted voltage command).

In some examples, the example control circuitry 112 may determine a weld cable 126 resistance and/or inductance (e.g., via $V_{cableDrop}$ and measurement circuit current). The example control circuitry 112 may then determine an adjusted output based on the determined weld cable 126 resistance and/or inductance (e.g., impedance).

Prior to performing welding, the example power supply 102 may not have a reliable measure of the weld cable 126 resistance. To better reflect the selected weld parameters at the arc, the example system 100 of FIG. 1 determines an initial estimate of the resistance and/or inductance of the weld cable 126. The control circuitry 112 may then control the output of the power conversion circuitry 110 based on the determined resistance and/or inductance, such as adjusting the output of the power conversion circuitry 110 to compensate for the determined resistance and/or inductance.

The control circuitry 112 communicates to the control circuitry 134, via communications circuitry 118 and communications circuitry 119, a command to close the switch 170. In response to the command, the control circuitry 134 controls the switch 170 to close. The communication may include a message that the system 100 will conduct a weld cable resistance/inductance measurement test. When the switch 170 is closed, the measurement circuit includes a portion of the weld circuit, including the power conversion circuitry 110, the weld cable 126, the switch 170, the voltage sense lead 156, the clamp 154, the workpiece 146, and the work cable 148.

The control circuitry 112 then commands the power conversion circuitry 110 to output a test signal at a controlled voltage via the measurement circuit. The control circuitry 112 controls the power conversion circuitry 110 to limit the current of the test signal to a threshold level. In the example of FIG. 1, the current and/or voltage levels of the test signal are less than the current and/or voltage levels of typical welding-type power. For example, the current limit of the test signal may between 100 mA and 200 A. The voltage monitor 160 measures the actual output voltage (e.g., the voltage output by the power conversion circuitry 110, the output voltage at the output terminals of the power supply 102, etc.) while outputting the test signal (e.g., a filtered voltage, a voltage at a specific time after the signal is initiated, a voltage at a time when the current threshold is satisfied). The voltage monitor 152 measures the voltage (e.g., a filtered voltage, a voltage at a time when the current threshold is satisfied) at the wire feeder 104 while the test signal is being output by the power supply 102.

The communications circuitry 119 transmits the wire feeder voltage measured by the voltage monitor 152 in response to the test signal to the communications circuitry 118. The transmitted voltage may be a sampled voltage, a filtered voltage, and/or any other voltage representative of the wire feeder voltage measured by the voltage monitor 152. The control circuitry 112 then compares the voltage at the wire feeder 104 $V_{feeder}$ to the actual output voltage $V_{stud}$ to determine the weld cable 126 voltage drop $V_{cableDrop}$. The control circuitry 112 determines the weld cable 126 resistance by dividing $V_{cableDrop}$ by the weld current. The weld current may be a current measured by the current sensor 168 (e.g., a filtered current, a current measured at a specific time after the signal is initiated) or the current threshold. The control circuitry 134 may command the switch 170 to open after the power conversion circuitry 110 ceases outputting the test signal. For example, the control circuitry 134 may control the switch 170 to open a set amount of time after the test signal is initiated, after receiving a communication from the welding power supply 102 commanding the switch 170 to open, or after the voltage monitor 152 senses the test signal has ended.

When the resistance measurement is determined by the control circuitry 112, the power supply 102 may use the measured resistance as the initial value for determining a weld cable voltage drop and control the primary power conversion circuitry 110 to increase an output voltage from a voltage setpoint and/or further refine the weld cable voltage drop measurement as disclosed in U.S. patent application Ser. No. 15/238,585 and U.S. patent application Ser. No. 15/238,589. The entireties of U.S. patent application Ser. No. 15/238,585 and U.S. patent application Ser. No. 15/238,589 are hereby incorporated by reference.

After the weld cable 126 resistance is determined, an inductance measurement test may be conducted. An inductance measurement test includes closing the switch 170, and outputting a test signal similarly to the resistance measurement. To determine inductance, the voltage monitor 152 samples the voltage at the feeder, the voltage monitor 160 samples the actual output voltage, and the current monitor 168 samples the current of the test signal, at several points during ramp up of the current when the test signal is output. The voltage of the weld cable $V_{cableDrop}$ can then be determined at several points during ramp up of the current when the test signal is output. The inductance of the weld cable is then determined by equation 2. The resistance and the inductance of the weld cable together encompasses the weld cable impedance.

$$V_{cableDrop} \times \frac{dt}{di} = L_{cable} \qquad \text{Equation 2}$$

In some examples, the control circuitry 112 may be configured to perform a weld cable resistance and/or weld cable inductance test prior to any welding operation. In some examples, the control circuitry 112 may be configured to perform a weld cable resistance and/or weld cable inductance test any time the welding power supply 102 is powered on and a wire feeder is first attached or re-attached to the power supply 102. The resistance of the work cable 148 could also be determined by similarly measuring the voltage at the workpiece 146 via another voltage monitor and comparing the voltage at the workpiece to the measured voltage at the opposite terminal of the welding power supply 102.

Figure 2:
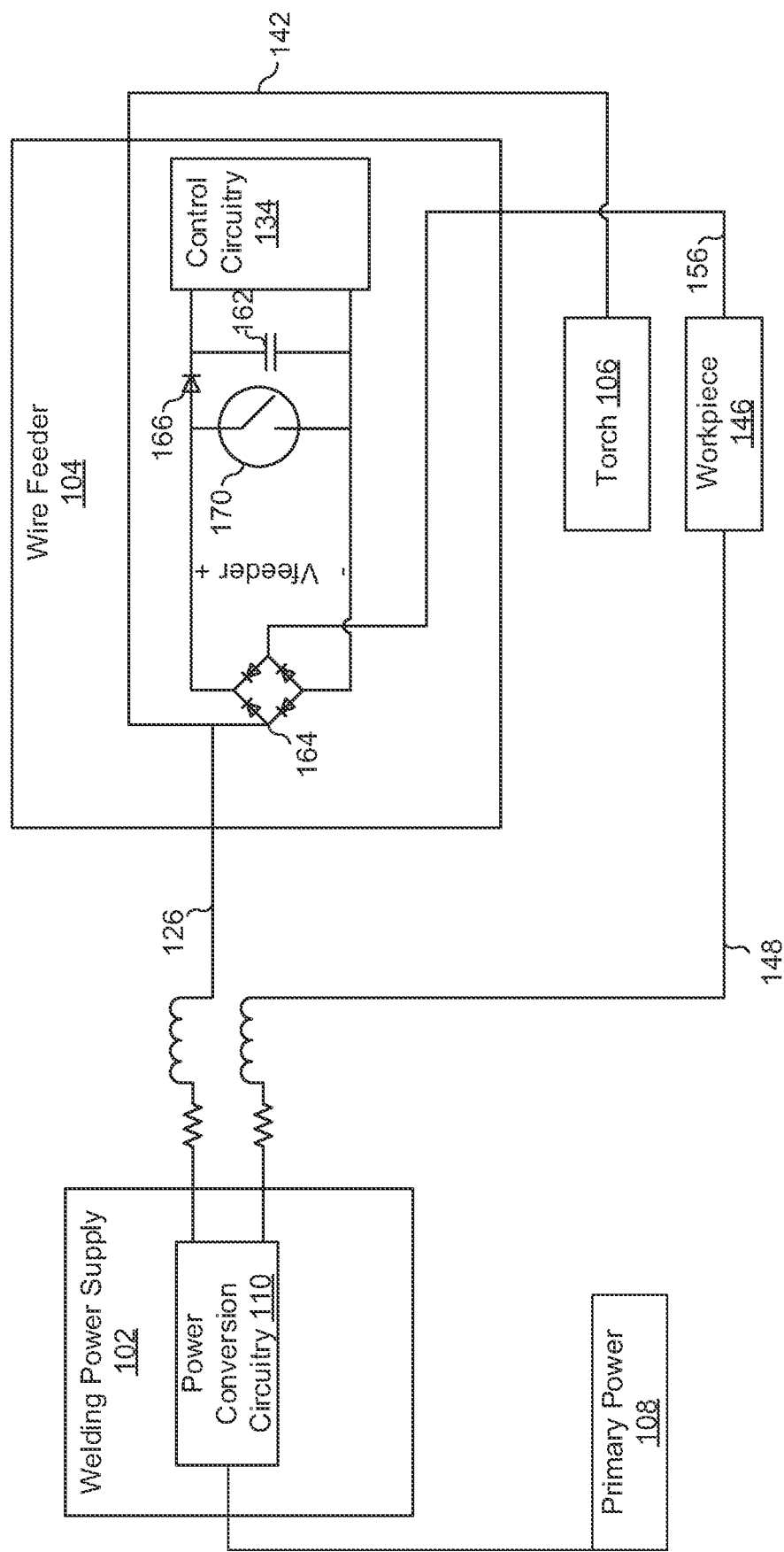
FIG. 2 is a schematic diagram of the weld circuit of the welding-type system of FIG. 1.

FIG. 2 is a schematic diagram of the weld circuit of the system 100. When the switch 170 is open, as in normal operation, the power conversion circuitry 110 converts input power received from a primary power source 108 to welding-type power. The welding-type current is output to the wire feeder 104 via the weld cable 126. The wire feeder 104 includes the energy storage device (e.g., a capacitor) 162, which is isolated from the weld circuit through a diode bridge 164, such that no current flows from the energy storage device 162 to the weld circuit when the weld circuit voltage is lower than the energy storage device charge voltage. Energy from the energy storage device 162 is used to supply power to the control circuitry 134 and other circuits of the wire feeder 104. Welding-type current flows from the wire feeder 104 to the torch 106. The welding-type current arcs from the torch 106 to the workpiece 146, and returns to the power conversion circuitry 110 via the work cable 148.

The weld cable 126 and the work cable 148 each have a resistance and an inductance. The switch 170 may be closed in order to measure the weld cable 126 resistance and/or inductance. The diode 166 prevents current from flowing from the capacitor 162 to the measurement circuit when the switch 170 is closed. When the switch 170 is closed, current output by the power conversion circuitry 110 flows through the diode bridge 164, the switch 170, the voltage sense lead 156, and then returns to the power conversion circuitry 110 via the work cable. Thus, closing the switch 170 completes the measurement circuit by bypassing the torch cable 142 and the torch 106.

Figure 3:
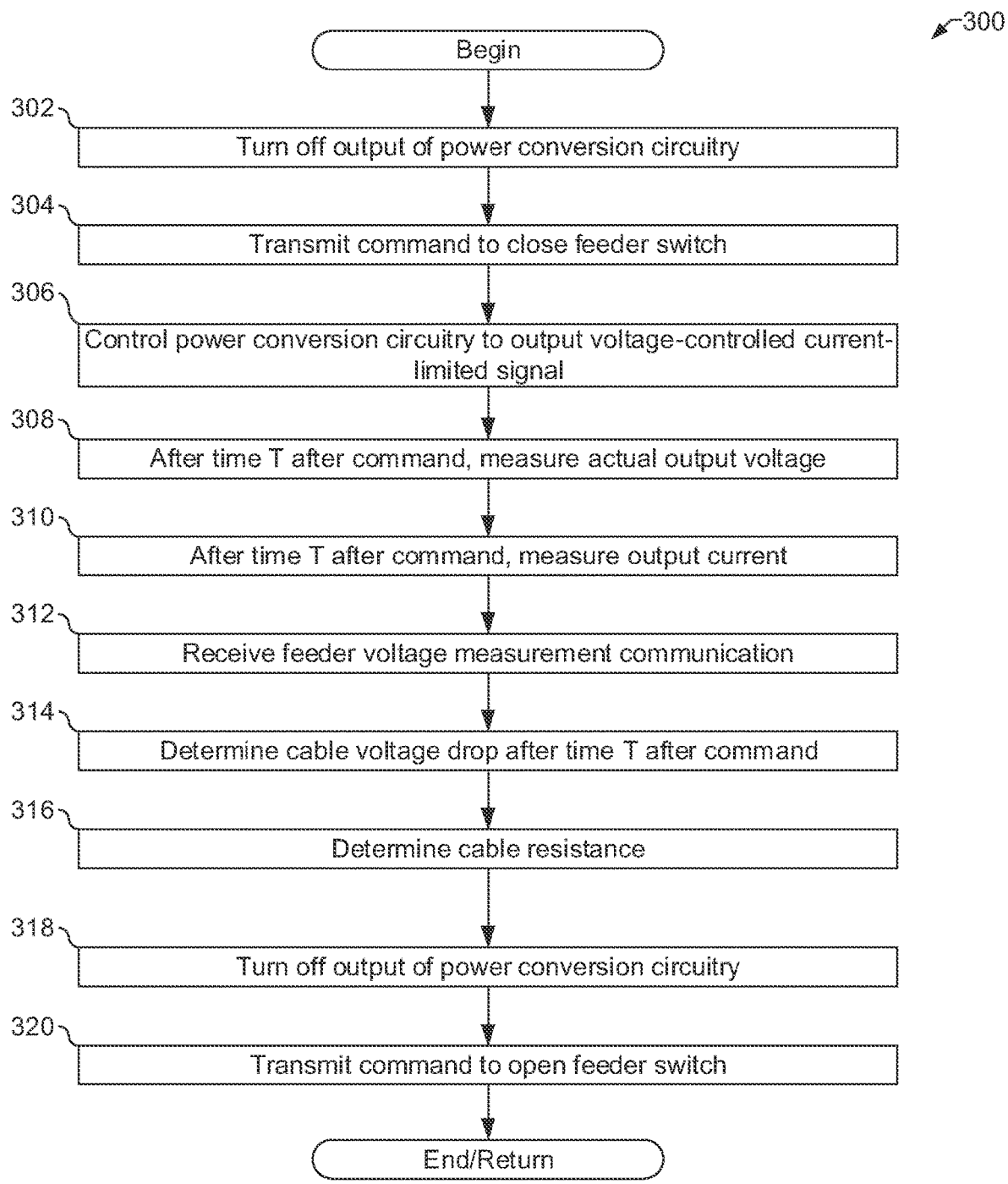
FIG. 3 is a flowchart illustrating example machine readable instructions which may be executed by the example welding-type power supply of FIG. 1 to determine a weld cable resistance.

FIG. 3 is a flowchart illustrating example machine readable instructions 300 which may be executed by the example control circuitry 112 of the welding-type power supply 102 of FIG. 1 to determine a resistance of the weld cable 126.

At block 302, the control circuitry 112 of the power supply 102 controls the power conversion circuitry 110 to turn off output. At block 304, the control circuitry 112 transmits a command, via the communications circuitry 118, to the wire feeder 104 to close the feeder switch 170. The command may be a communication indicating that the power supply 102 will perform a weld cable resistance measurement test. The control circuitry 134 of the wire feeder 104 controls the switch 170 to close after receiving the command.

At block 306, the control circuitry 112 controls the power conversion circuitry 110 to output a voltage-controlled current-limited signal in order to determine the resistance of the weld cable 126. The power level of the signal is less than the power level of welding-type power. In other words, the magnitude of the current and/or the voltage of the signal is less than the magnitude of the current and/or voltage of welding-type power.

At block 308, after a predetermined duration of time T after the command was sent (block 304), the voltage monitor 160 measures the actual output voltage of the power conversion circuitry 110. The duration T is selected to have consistent output from the power conversion circuitry 110 and short enough in duration to reduce or prevent inaccuracies resulting from heating of the weld cable 126 by the current. At block 310, after the duration T after the command, the current monitor 168 measures the output current of the power conversion circuitry 110. At block 312, the control circuitry 112, receives from wire feeder via the communications circuitry 118, a feeder voltage measurement. The feeder voltage measurement is measured after the duration T after the command by the voltage monitor 152, and transmitted by the wire feeder 104 via the communications circuitry 119. In some examples, the voltage measurement taken by the voltage sensor 160 and the current measurement taken by current sensor 168 are timestamped. The wire feeder 104 may transmit an array of sampled timestamped voltages at block 314. The control circuitry 112 may select the voltage measurement in the array having a timestamp that corresponds to the timestamped voltage and/or current measurements taken at blocks 308 and 310.

At block 314, the control circuitry 112 determines the voltage drop across the weld cable 126, $V_{cableDrop}$. $V_{cableDrop}$ is equal to the received feeder voltage (received at block 312) subtracted from the actual output voltage (measured at block 308). At block 316, the control circuitry 112 determines the weld cable 126 resistance. The weld cable resistance is equal to the determined $V_{cableDrop}$ (block 314) divided by the measured output current (block 310). In some examples, a current monitor 168 is not used, and instead the current limit is used to determine the weld cable 126 resistance.

At block 318, the control circuitry 112 commands the power conversion circuitry 110 to turn off the test signal. At block 320, the control circuitry 112 transmits, via the communications circuitry 118, a command to open the switch 170. The control circuitry 134 then commands the switch 170 to open. In some examples, the control circuitry 134 is configured to automatically open the switch 170 at a predetermined period of time after receiving the communication to close the switch rather than waiting for a command from the power supply 102 to open the switch 170 (block 304).

The determined resistance may be displayed via the user interface 114 (e.g., via the display 116). In some examples, if the determined resistance exceeds a threshold, the user interface 114 may display an error. In some examples, if the determined resistance exceeds a threshold, the control circuitry 112 may prevent the power conversion circuitry 110 from outputting welding-type power. For example, the control circuitry 112 may prevent the power conversion circuitry 110 from outputting welding-type power until another resistance measurement test is run in which the determined resistance is less than the threshold. In some examples, the threshold may be stored in memory 124. In some examples, the threshold resistance may correspond to a selected welding application.

The control circuitry 112 may control the power conversion circuitry 110 to output welding-type power for welding applications based on the determined resistance. U.S. Patent Application Publication No. 2018/0257162 by Nathan W. Johnson and Brian L. Ott, titled "Welding Power Supplies, Wire Feeders, And Systems to Measure a Weld Circuit Resistance Via Communications Over the Weld Circuit" disclose methods for controlling the output of a welding-type power source based on a cable resistance. U.S. Patent Application Publication No. 2018/0257162 is hereby incorporated by reference in its entirety.

In some examples the instructions 300 may be executed on command (e.g., an operator may command the system 100 to perform a resistance measurement test via the user interface 114). In some examples, the instructions 300 may be automatically executed when the power supply 102 is turned on and connected to a wire feeder 104 via cables 126 and 148. In some examples, the instructions 300 may be automatically executed when a welding application is selected (e.g., prior to the power supply outputting welding-type power for the selected welding application).

Figure 4:
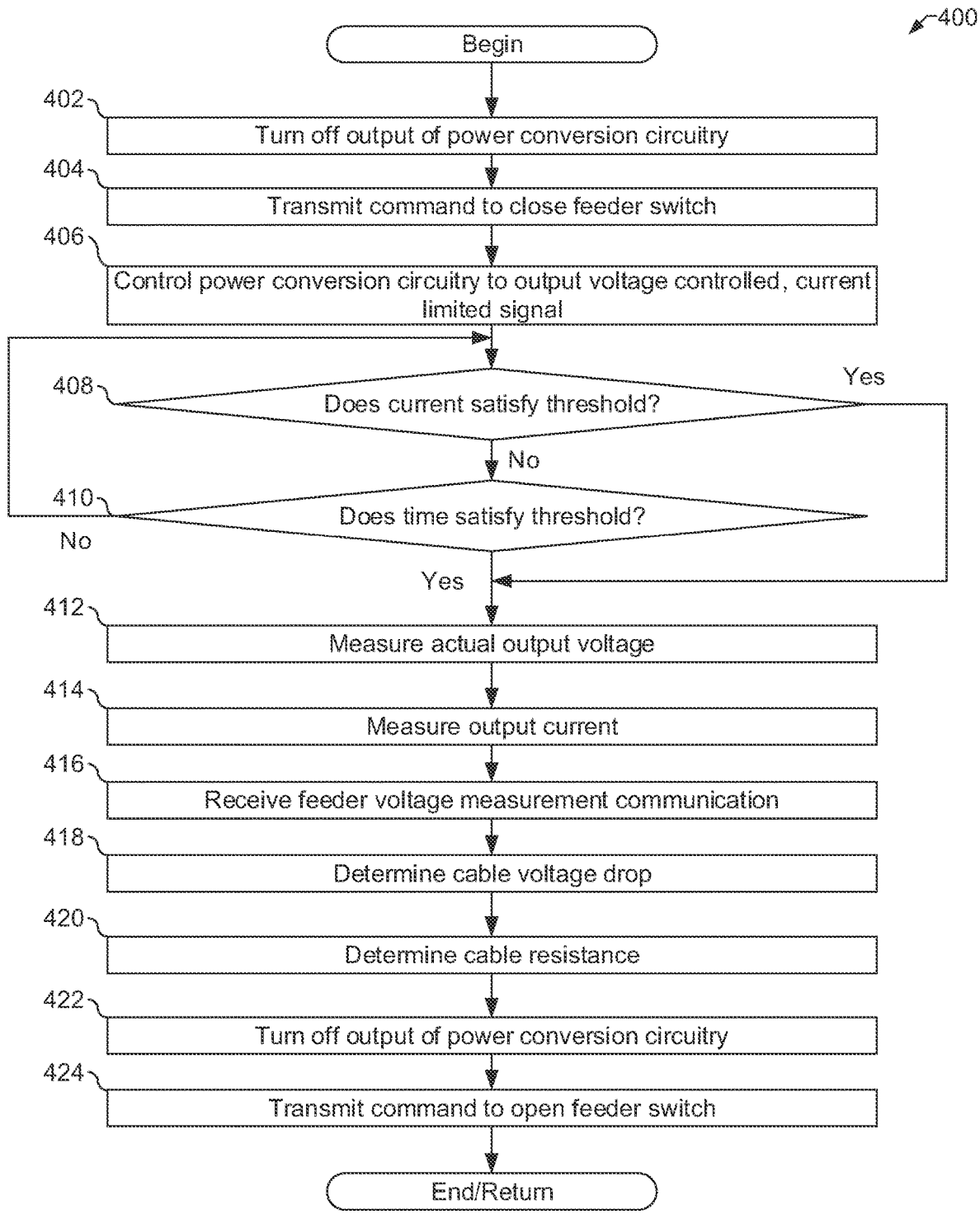
FIG. 4 is a flowchart illustrating additional example machine readable instructions which may be executed by the example welding-type power supply of FIG. 1 to determine a weld cable resistance.

FIG. 4 is a flowchart illustrating another example machine readable instructions 400 which may be executed by the example control circuitry 112 of the welding-type power supply 102 of FIG. 1 to determine a resistance of the weld cable 126.

At block 402, the control circuitry 112 of the power supply 102 controls the power conversion circuitry 110 to turn off output. At block 404, the control circuitry 112 transmits a command, via the communications circuitry 118, to the wire feeder 104 to close the feeder switch 170. The command may be a communication indicating that the power supply 102 will perform a weld cable resistance measurement test. The control circuitry 134 of the wire feeder 104 controls the switch 170 to close.

At block 406, the control circuitry 112 controls the power conversion circuitry 110 to output a voltage-controlled current-limited signal in order to determine the resistance of the weld cable 126. The power level of the signal is less than the power level of welding-type power.

At block 408, the control circuitry 112 checks if the output current (measured by the current monitor 168) satisfies a threshold (e.g., has reached the current limit). If the current satisfies the threshold (block 408), then the method proceeds to block 412. If the current does not satisfy the threshold (block 408), then at block 410, the control circuitry 112 checks if the time since the communication was sent (block 404) satisfies a threshold. If the time does not satisfy the threshold (block 410), then the method returns to block 408. If the time does satisfy the threshold (block 410) then the method proceeds to block 412. At block 412 the control circuitry 112 measures the actual output voltage via the voltage monitor 160. The actual output voltage may be an instantaneous voltage or may be a filtered voltage (e.g., average voltage) of the voltage measured since the communication (block 404). At block 414 the control circuitry 112 measures the output current via the current monitor 168. The measured current may be an instantaneous current or may be a filtered (e.g, average current) of the current measured since the communication (block 404). At block 416, the control circuitry 112 receives from the wire feeder 104 via the communications circuitry 118 a communication including the measured voltage at the wire feeder 104. The measured voltage at the feeder, measured by the voltage monitor 152, may be an instantaneous voltage or may be a filtered voltage (e.g, average voltage) of the voltage measured since the communication (block 404).

At block 418, the control circuitry 112 determines the voltage drop across the weld cable 126, $V_{cableDrop}$. $V_{cableDrop}$ is equal to the received feeder voltage (received at block 416) subtracted from the actual output voltage (measured at block 412). At block 420, the control circuitry 112 determines the weld cable 126 resistance. The weld cable resistance is equal to the determined $V_{cableDrop}$ (block 418) divided by the measured output current (block 414). In some examples, a current monitor 168 is not used, and instead the current limit is used to determine the weld cable 126 resistance.

At block 422, the control circuitry 112 commands the power conversion circuitry 110 to turn off the test signal. At block 424, the control circuitry 112 transmits, via the communications circuitry 118, a command to open the switch 170. The control circuitry 134 then commands the switch 170 to open. In some examples, the control circuitry 134 is configured to automatically open the switch 170 at a predetermined period of time after receiving the communication to close the switch 170 (block 404.)

Figure 5:
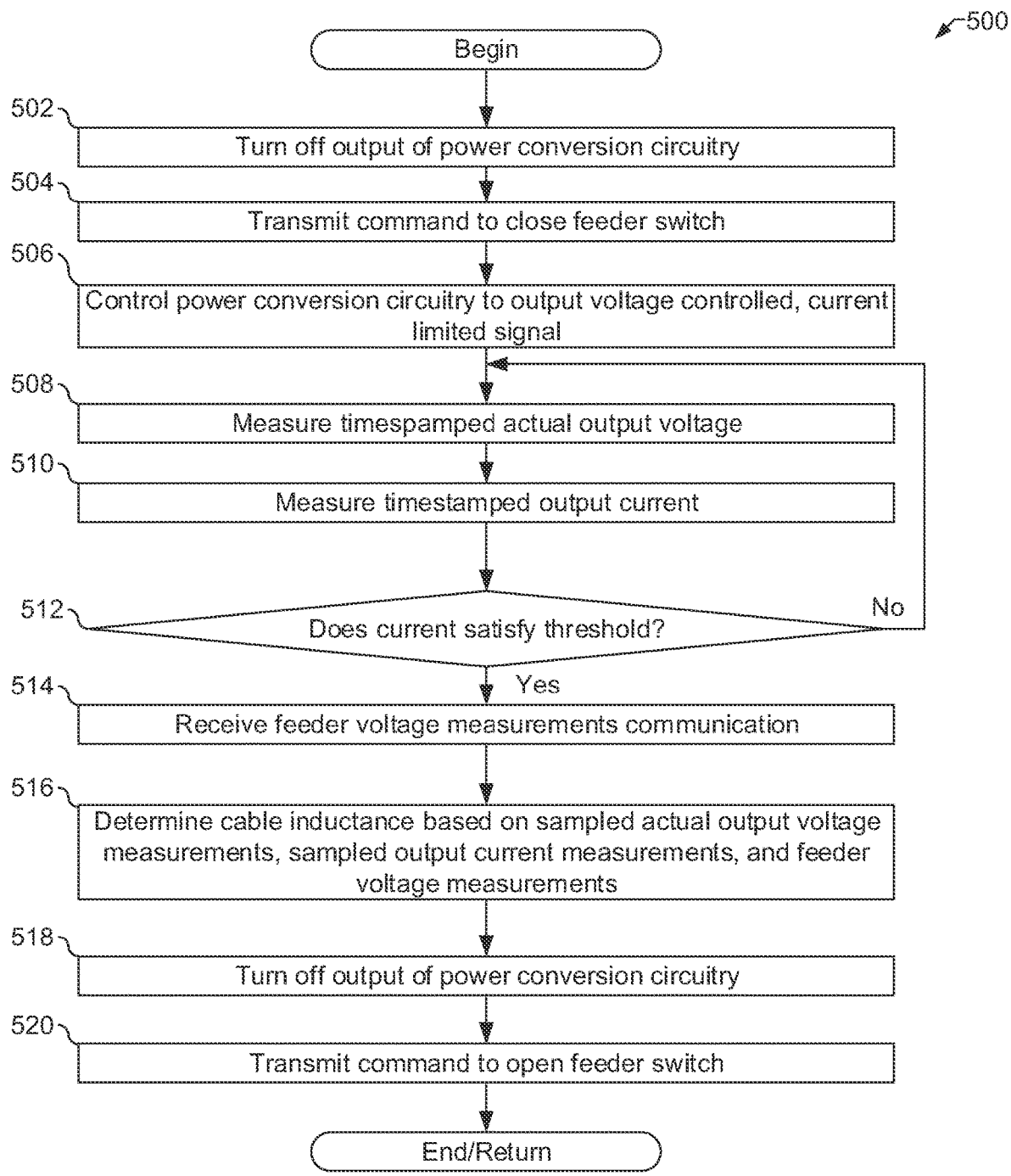
FIG. 5 is a flowchart illustrating example machine readable instructions which may be executed by the example welding-type power supply of FIG. 1 to determine a weld cable inductance.

FIG. 5 is a flowchart illustrating example machine readable instructions 500 which may be executed by the example control circuitry 112 of the welding-type power supply 102 of FIG. 1 to determine an inductance of the weld cable 126.

At block 502, the control circuitry 112 of the power supply 102 controls the power conversion circuitry 110 to turn off output. At block 504, the control circuitry transmits a command, via the communications circuitry 118, to the wire feeder 104 to close the feeder switch 170. The command may be a communication indicating that the power supply 102 will perform a weld cable inductance measurement test. The control circuitry 134 of the wire feeder 104 controls the switch 170 to close.

At block 506, the control circuitry 112 controls the power conversion circuitry 110 to output a voltage-controlled current-limited signal in order to determine the inductance of the weld cable 126. The power level of the signal is less than the power level of welding-type power.

At block 508, the voltage monitor 160 measured the actual output voltage, and the control circuitry 112 saves and timestamps the actual voltage measurement. At block 510, the current monitor 168 measures the output current, and the control circuitry 112 saves and timestamps the actual current measurement. At block 512, the control circuitry 112 determines whether the last measured current satisfies a threshold. If the last measured current does not satisfy the threshold (block 512), then the method returns to block 508 and takes additional measurements. If the measured current satisfies the threshold (block 512), then the method proceeds to block 514. At block 514, the control circuitry 112 receives from the wire feeder 104, via communications circuitry 118, timestamped voltage measurements measured by the voltage monitor 152 (e.g., an array of feeder voltage measurements).

At block 516, the control circuitry 112 determines the weld cable 126 inductance based on the array of received feeder voltage measurements, the array of stored measured actual output voltage measurements, and the array of current measurements. As explained above with respect to equation 2, $$V_{cableDrop} \times \frac{dt}{di} = L_{cable}.$$

Accordingly, the control circuitry 112 can determine the inductance of the weld cable 126 $L_{cable}$ based on the time-stamped received feeder voltage, actual output voltage, and output current arrays.

At block 518, the control circuitry 112 commands the power conversion circuitry 110 to turn off the test signal. At block 520, the control circuitry transmits, via the communications circuitry 118, a command to open the switch 170. The control circuitry 134 then commands the switch 170 to open. In some examples, the control circuitry 134 is configured to automatically open the switch at a predetermined period of time after receiving the communication to close the switch 170 (block 304.) In some examples the control circuitry 134 is configured to control the switch 170 to open the measurement circuit in response to the current monitor 168 determining that the current of the first signal has reached a threshold magnitude.

The determined inductance may be displayed via the user interface 114. In some examples, if the determined inductance exceeds a threshold, the user interface 114 may display an error. In some examples, if the determined inductance exceeds a threshold, the control circuitry 112 may prevent the power conversion circuitry 110 from outputting welding-type power. For example, the control circuitry 112 may prevent the power conversion circuitry 110 from outputting welding-type power until another inductance measurement test is run in which the determined inductance is less than the threshold. In some examples, the threshold may be stored in memory 124. In some examples, the threshold inductance may correspond to a selected welding application. The control circuitry 112 may control the power conversion circuitry 110 to output welding-type power for welding applications based on the determined inductance.

In some examples the instructions 500 may be executed on command (e.g., an operator may command the system 100 to perform a resistance measurement test via the user interface 114). In some examples, the instructions 500 may be automatically executed when the power supply 102 is turned on and connected to a wire feeder 104 via cables 126 and 148. In some examples, the instructions 300 may be automatically executed when a welding application is selected (e.g., prior to the power supply outputting welding-type power for the selected welding application). In some examples, the instructions 500 are automatically executed after the control circuitry 112 determines the resistance (e.g., via executing instructions 300 or 400). Accordingly, in some examples, the impedance of the weld cable 126 (e.g., the resistance and the inductance) may be automatically determined by the control circuitry 112. The control circuitry 112 may control the output of the power conversion circuitry 110 based on the determined impedance and a voltage setpoint.

Figure 6:
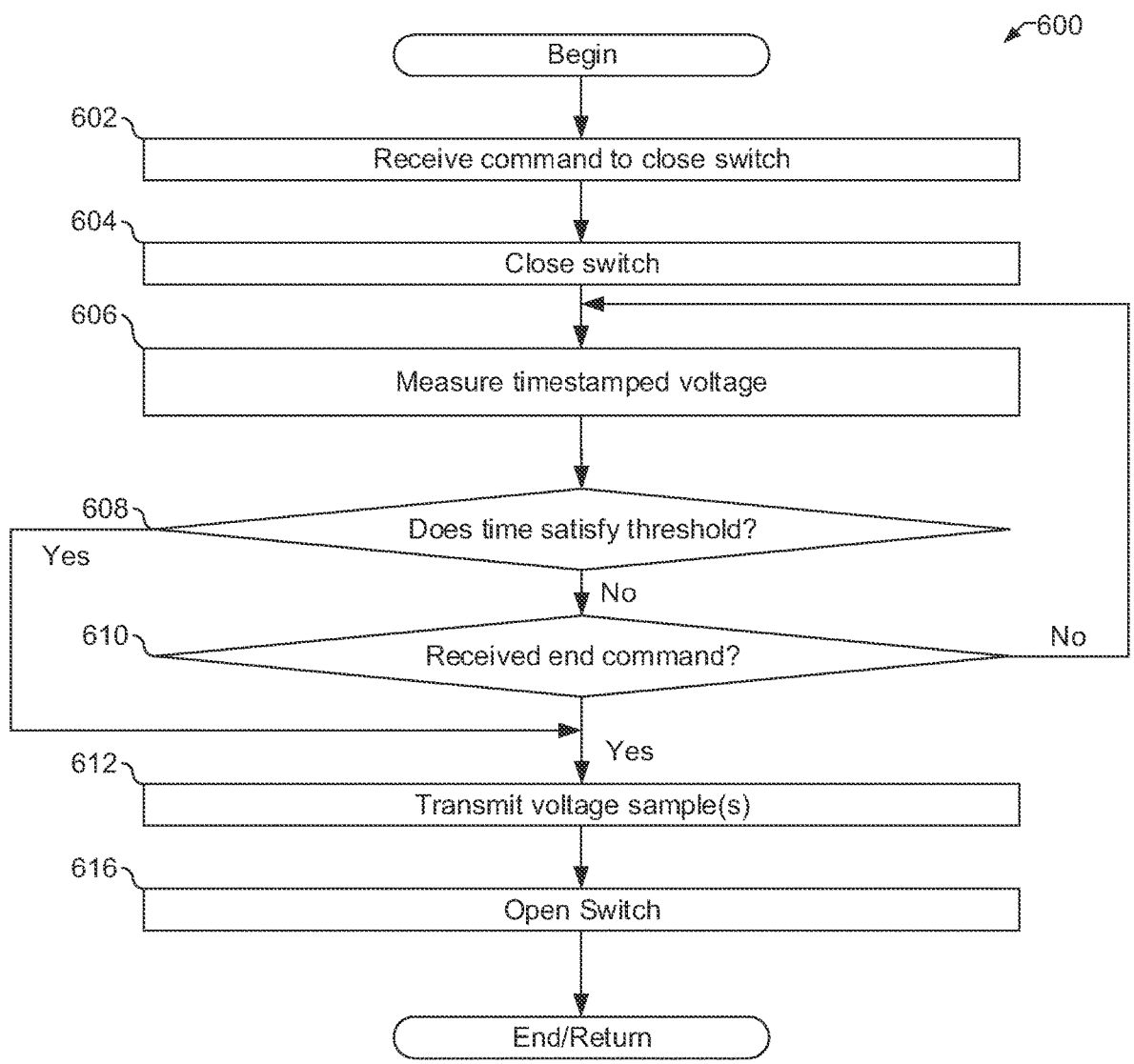
FIG. 6 is a flowchart illustrating example machine readable instructions which may be executed by the example wire feeder of FIG. 1 to determine a weld cable impedance.

FIG. 6 is a flowchart illustrating example machine readable instructions 600 which may be executed by the example control circuitry 134 of the wire feeder 104 of FIG. 1 during an impedance measurement test.

At block 602, the control circuitry 134 receives, via the communications circuitry 119, a command to close the switch 170. The command may be a communication indicating that the power supply 102 will perform a weld cable resistance or inductance measurement test. At block 604, the control circuitry 134 controls the switch 170 to close. At block 606, the control circuitry measures the wire feeder voltage via the voltage sensor 152, timestamps the voltage measurement, and saves the measurement in memory 124.

At block 608, the control circuitry 134 determines whether the time since receiving the command (block 602) satisfies a threshold. If the time satisfies the threshold (block 608), the control circuitry 134 proceeds to block 612. If the time does not satisfy the threshold (block 608), then the control circuitry 134 proceeds to block 610. At block 610, the control circuitry 134 checks if the control circuitry 134 has received an end command from the power supply 102 via the communications circuitry 119. If the control circuitry 134 has not received an end command (block 610), then the control circuitry 134 returns to block 606 and takes and saves another timestamped voltage measurement. If the control circuitry receives an end command (block 610), then the control circuitry proceeds to block 612.

At block 612, the control circuitry 134 transmits the saved voltage measurement(s) to the power supply 102 via the communications circuitry 119. In some examples, the control circuitry 134 transmits the most recent voltage measurement. In some examples, the control circuitry 134 transmits all saved and timestamped voltage measurements taken during the impedance measurement test. In some examples, the control circuitry transmits a filtered (e.g., an average) voltage measurement. At block 614, the control circuitry 134 controls the switch 170 to open.

In some examples, rather than opening the switch 170 between test signals (e.g., between a resistance measurement test and an inductance measurement test, the control circuitry 112 may control the power conversion circuitry 110 to adjust the current limit of the test signal. For example, rather than opening the switch, the control circuitry 112 may change the current limit to zero amps after a resistance measurement test (e.g., at block 320 of the instructions 300 or block 424 of the instructions 400, the control circuitry 112 may change the current limit of the test signal output by the power conversion circuitry 110 to zero amps instead of transmitting a command to open the switch 170) Likewise, if the switch 170 is already closed after a resistance measurement test, the control circuitry 112 does not send a command to close the feeder switch 170 in a subsequent inductance measurement test (e.g., the control circuitry 112 may skip block 504 of the instructions 500, and then at block 506, the control circuitry may then increase the current limit to a test signal level).

In some examples, to conduct an inductance measurement test after a resistance measurement test, the control circuitry changes the current limit of the test signal without opening the switch 170 or changing the current limit to zero amps. As $$V_{cableDrop} \times \frac{dt}{di} = L_{cable},$$

inductance of the cable 126, $L_{cable}$, may be determined based on a change in the measurement circuit current. Therefore, the inductance of the cable 126 may be determined by adjusting the current limit of the test signal, which causes a change in the current in the measurement circuit. As described with respect to FIG. 5, the timestamped voltage and current measurements taken at the welding power supply 102 and the wire feeder 104 during the time when the measurement circuit current is changing after the current limit is adjusted may then be used to determine the inductance of the cable 126, based on the equation $$V_{cableDrop} \times \frac{dt}{di} = L_{cable}.$$

While the examples of FIGS. 3-6 disclose measuring the circuit current at the power supply 102, the current may additionally or alternatively be measured at the wire feeder 104. The current measurements and/or filtered current measurements may be communicated to the power supply 102.

In some examples, the control circuitry 134 of the wire feeder 104 may determine the resistance, inductance, and/or impedance of the weld cable. For example, the control circuitry 134 of the wire feeder 102 may transmit a command via the communications circuitry 119 to the power supply 102 commanding the power supply 102 to conduct a weld cable resistance and/or inductance measurement test. The control circuitry 134 may then command the switch 170 to close, and then measure the feeder voltage via the voltage monitor 152 when the power supply 102 provides a voltage-controlled current-limited test signal. The control circuitry 134 may then receive from the power supply 102 via the communications circuitry 119 a measured actual output voltage measured by the voltage monitor 160 and a measured current measured by the current monitor 168. In some examples, the wire feeder 104 may include a current monitor. The control circuitry 134 may then determine the resistance and/or inductance of the weld cable 126 based on the feeder voltage, the actual output voltage, and the measured current, as described above. The control circuitry 134 may then transmit the determined resistance and/or inductance to the control circuitry 112 of the power supply 102 via the communications circuitry 119 and 118.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
   power conversion circuitry configured to convert input power to welding-type power;
   a voltage monitor configured to measure a power supply output voltage of the power conversion circuitry;
   communication circuitry configured to transmit a first communication to a welding device coupled to a weld circuit, wherein the first communication comprises a command to the welding device to close a switch to complete a measurement circuit, wherein the measurement circuit comprises a first portion of the weld circuit; and
   control circuitry configured to control the power conversion circuitry to:
     output a first signal at a controlled voltage to the measurement circuit; and
     after the first communication, limit a current of the first signal to a first threshold level;
   wherein the communication circuitry is configured to receive, from the welding device, a second communication indicating a welding device voltage measured in response to the first signal; and
   wherein the control circuitry is configured to determine a resistance of a second portion of the weld circuit based on the power supply output voltage, the welding device voltage, and the current of the first signal.

2. The welding-type power supply of claim 1, wherein the switch is configured to open a threshold period of time after closing.

3. The welding-type power supply of claim 1, further comprising a current monitor configured to measure a current of the measurement circuit.

4. The welding-type power supply of claim 3, wherein the communication circuitry is configured to send a third communication to the welding device when the current monitor senses that current of the first signal has reached the threshold level, wherein the third communication commands the welding device to open the switch.

5. The welding-type power supply of claim 3, wherein the communication circuitry is configured to send a third communication to the welding device a threshold period of time after the current monitor senses that the current of the first signal has reached the threshold level, wherein the third communication commands the welding device to open the switch.

6. The welding-type power supply of claim 3, wherein the control circuitry is configured to determine the resistance of the second portion of the weld circuit based on the measured current of the first signal.

7. The welding-type power supply of claim 1, wherein a magnitude of the first threshold level is less than a magnitude of the welding-type power current.

8. The welding-type power supply of claim 1, wherein the control circuitry is configured to control the power conversion circuitry to output the welding-type power based on the determined resistance.

9. The welding-type power supply of claim 1, wherein the control circuitry is configured to control the power conversion circuitry to output the welding-type power based on the determined resistance and a weld process parameter.

10. The welding-type power supply of claim 1, wherein the control circuitry is configured to determine the resistance of the second portion of the weld circuit prior to outputting welding-type current.

11. The welding-type power supply of claim 1:
    wherein the communications circuitry is configured to transmit a third communication to the welding device, wherein the third communication comprises a command to the welding device to close the switch to complete the measurement circuit;
    wherein the control circuitry is configured to control the power conversion circuitry to:
      output a second signal at the controlled voltage to the measurement circuit; and
      after the third communication, limit a current of the second signal to a second threshold level;
    wherein the communications circuitry is further configured to receive a fourth communication from the welding device indicating a plurality voltage measurements during the second signal; and
    wherein the control circuitry is configured to determine an impedance of the second portion of the weld circuit based on the determined resistance, a plurality of current measurements, and the plurality voltage measurements.

12. The welding-type power supply of claim 11, wherein the second signal is output after the first signal.

13. The welding-type power supply of claim 12, wherein the switch is automatically opened between the first signal and the second signal.

14. The welding-type power supply of claim 11, wherein the control circuitry is configured to control the power conversion circuitry to output the welding-type power based on the determined impedance.

15. The welding-type power supply of claim 1, wherein the communications circuitry is configured to communicate with the welding device via the weld circuit.

16. A welding device comprising:
    communications circuitry configured to communicate with a welding-type power supply;
    a switch configured to selectively complete a measurement circuit, wherein the measurement circuit comprises a portion of a weld circuit;
    control circuitry configured to control the switch to complete the measurement circuit in response to a first communication from the welding-type power supply; and a voltage monitor configured to measure a voltage of a first signal received via the measurement circuit in response to detecting the first signal following reception of the first communication, the communications circuitry configured to transmit a second communication to the welding-type power supply based on the measured voltage of the first signal.

17. The welding device of claim 16, wherein the welding device is a wire feeder.

18. The welding device of claim 16, further comprising a current monitor configured to monitor a current of the first signal, and wherein the control circuitry is configured to control the switch to open the measurement circuit in response to the current monitor determining that the current of the first signal has reached a threshold magnitude.

19. The welding device of claim 16, further comprising a current monitor configured to monitor a current of the first signal, and wherein the control circuitry is configured to control the switch to open the measurement circuit a threshold period of time after the current monitor determines that the current of the first signal has reached a threshold magnitude.

20. The welding device of claim 16, wherein the control circuitry is configured to control the switch to open the measurement circuit a threshold period of time after receiving the first communication.

* * * * *